United States Patent
Bandaru et al.

(10) Patent No.: US 8,166,013 B2
(45) Date of Patent: Apr. 24, 2012

(54) METHOD AND SYSTEM FOR CRAWLING, MAPPING AND EXTRACTING INFORMATION ASSOCIATED WITH A BUSINESS USING HEURISTIC AND SEMANTIC ANALYSIS

(75) Inventors: Nagaraju Bandaru, San Jose, CA (US); Eric D. Moyer, Belmont, CA (US); Shrisha Radhakrishna, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 392 days.

(21) Appl. No.: 12/290,825

(22) Filed: Nov. 4, 2008

(65) Prior Publication Data
US 2009/0119268 A1 May 7, 2009

Related U.S. Application Data

(60) Provisional application No. 61/002,040, filed on Nov. 5, 2007.

(51) Int. Cl.
G06F 17/00 (2006.01)
(52) U.S. Cl. ........................................ 707/705; 707/706
(58) Field of Classification Search .................. 707/705, 707/999.003, 708, 706
See application file for complete search history.

(56) References Cited

U.S. PATENT DOCUMENTS

| | | | | |
|---|---|---|---|---|
| 7,181,448 | B2 * | 2/2007 | Silverbrook et al. | 707/770 |
| 7,246,101 | B2 * | 7/2007 | Fu et al. | 706/46 |
| 7,287,018 | B2 * | 10/2007 | Lennon | 707/694 |
| 2005/0201527 | A1 * | 9/2005 | Meer et al. | 379/45 |
| 2009/0106148 | A1 * | 4/2009 | Prada | 705/41 |

OTHER PUBLICATIONS

Baharlou, Simin, International Preliminary Report on Patentability dated May 11, 2010; International Application No. PCT/US2008/012464.
Young, Lee W., Written Opinion of the International Searching Authority dated Jan. 12, 2009; International Application No. PCT/US2008/12464.

* cited by examiner

*Primary Examiner* — Mohammad Ali
*Assistant Examiner* — John Hocker
(74) *Attorney, Agent, or Firm* — Osha • Liang LLP

(57) ABSTRACT

A method and system for crawling multiple websites containing one or more web pages having information relevant to a particular domain of interest, such as details about local restaurants, extracting content from such websites, such as hours, location and phone number as well as reviews, review dates and other business specific information, and associating the extracted content with a specific business entity.

15 Claims, 15 Drawing Sheets

Address Listing on a Website

Start of webpage . . . . . . . .

The Counter
(650) 321-3900
369 S California Ave, Palo Alto, CA 94306 Map it | Get directions
Cross Streets: Between Ash St and Birch St . . . . . . . rest of webpage

Entity Generation Process - Sample Sequence

The Counter | 650-321-3900 | 45505819| 369 California Avenue, Palo Alto California 94306 | 8
Associating Phone-> -- | -- | -- | -- | -- | -- | 650-321-3900 | 0 |
Associating Street Number C2-> 369 | -- | -- | -- | -- | -- | 650-321-3900 | 0 |
Associating Street Directional-> South 369 | South | -- | -- | -- | -- | 650-321-3900 | 0 |
Associating Street Thoroughfare-> 369 | South | -- | Avenue | -- | -- | 650-321-3900 | 0 |
Associating Street Name-> 369 | South | California | Avenue | -- | -- | 650-321-3900 | 0 |
Associating City-> 369 | South | California | Avenue | -- | Palo Alto | -- | -- | 650-321-3900 | 0 |
Associating State-> 369 | South | California | Avenue | -- | Palo Alto | California | -- | 650-321-3900 | 0 |
Associating Zip-> 369 | South | California | Avenue | -- | Palo Alto | California | 94306 | 650-321-3900 |
Entity Map by Phone:650-321-3900 369 | South | California | Avenue | -- | Palo Alto | California | 94306 |
650-321-3900|8

FIGURE 7A

Source URL: http://local.yahoo.com/info-34861386-the-counter-palo-alto

Entity 1:
NAME - The Counter
ADDRESS - 369 S California Avenue, Palo Alto CA 94306
PHONE - 650-321-3900

Entity 2:
NAME - British Bankers Club
ADDRESS - Menlo Park CA

Entity 3:
NAME - Laurel Quality Cleaners
ADDRES - San Carlos CA

- -

Entity 14:

FIGURE 7B

```
<?xml version="1.0"?>
<xsl:stylesheet xmlns:xsl="http://www.w3.org/1999/XSL/Transform"
    version="2.0" xmlns:b="http://www.boorah.com/extract">
    <xsl:template match="/">
        <b:itemList>
            <xsl:for-each
                select="//div[@id='profile-content']/div[2]/div[3]/div">
                <item type="review">
                    <meta property="text">
                        <xsl:value-of select="p[2]" />
                    </meta>
                    <meta property="reviewer">
                        <xsl:value-of select="p[1]/a" />
                    </meta>
                    <meta property="date"
                        regex="([0-1]\d[- /.][0-3]\d[- /.]\d\d\d\d)">
                        <xsl:value-of select="p[1]" />
                    </meta>
                    <meta property="score" regex="([1-5])\s* .*">
                        <xsl:value-of
                            select="div[@class='rating']/img/@title" />
                    </meta>
                </item>
            </xsl:for-each>
        </b:itemList>
    </xsl:template>
</xsl:stylesheet>
```

FIGURE 9

```
<?xml version="1.0"?>
<source_uri_pattern>
<row>
    <source_id>18</source_id>
    <regex>/profile/([0-9]+)/.*/.*.html</regex>
    <source_uid_regex_group_num>1</source_uid_regex_group_num>
    <map>Y</map>
    <extract>Y</extract>
    <biz_profile_uri>Y</biz_profile_uri>
    <xslt>citysearch_profile.xsl</xslt>
    <do_depth_crawl>Y</do_depth_crawl>
    <leaf_node>N</leaf_node>
</row>
<row>
    <source_id>18</source_id>
    <regex>/review/([0-9]+)/(\?rpp=[0-9]+.*)?$</regex>
    <source_uid_regex_group_num>1</source_uid_regex_group_num>
    <map>Y</map>
    <extract>N</extract>
    <biz_profile_uri>N</biz_profile_uri>
    <xslt>NULL</xslt>
    <do_depth_crawl>Y</do_depth_crawl>
    <leaf_node>N</leaf_node>
</row>
```

FIGURE 10A

```
<row>
    <source_id>18</source_id>
    <regex>/yellowpages/results/.*/page[0-9]+\.html\?flavor_id=2$</regex>
    <source_uid_regex_group_num>NULL</source_uid_regex_group_num>
    <map>N</map>
    <extract>N</extract>
    <biz_profile_uri>N</biz_profile_uri>
    <xslt>NULL</xslt>
    <do_depth_crawl>N</do_depth_crawl>
    <leaf_node>N</leaf_node>
</row>
<row>
    <source_id>18</source_id>
    <regex>/review/([0-9]+)/[0-9]+$</regex>
    <source_uid_regex_group_num>1</source_uid_regex_group_num>
    <map>Y</map>
    <extract>Y</extract>
    <biz_profile_uri>N</biz_profile_uri>
    <xslt>citysearch_review.xsl</xslt>
    <do_depth_crawl>N</do_depth_crawl>
    <leaf_node>Y</leaf_node>
</row>
```

FIGURE 10B

```xml
<row>
  <source_id>18</source_id>
  <regex>^/$</regex>
  <source_uid_regex_group_num>NULL</source_uid_regex_group_num>
  <map>N</map>
  <extract>N</extract>
  <biz_profile_uri>N</biz_profile_uri>
  <xslt>NULL</xslt>
  <do_depth_crawl>N</do_depth_crawl>
  <leaf_node>N</leaf_node>
</row>
</source_uri_pattern>
```

FIGURE 10C

| Attribute Name | Attribute Value |
|---|---|
| BlogAuthorStart | <H2 class="widgettitle"> |
| BlogAuthorEnd | </H2> |
| BlogContentStart | <DIV class="snap_preview"> |
| BlogContentEnd | </DIV> |
| BlogDescriptionStart | <DIV class="snap_preview"> |
| BlogDescriptionEnd | </DIV> |
| BlogPostEntryTitleStart | <DIV class="post"> |
| BlogPostEntryTitleEnd | </DIV> |

FIGURE 12

METHOD AND SYSTEM FOR CRAWLING, MAPPING AND EXTRACTING INFORMATION ASSOCIATED WITH A BUSINESS USING HEURISTIC AND SEMANTIC ANALYSIS

CROSS-REFERENCE TO RELATED APPLICATIONS

This application claims the benefit of Provisional Patent Application Ser. No. US61/002,040 filed Nov. 5, 2007 by the present inventors.

FEDERALLY SPONSORED RESEARCH

None

SEQUENCE LISTING

None

BACKGROUND OF THE INVENTION

This invention relates, in general, to a method and system for associating, extracting or mapping content found on multiple websites related to a specific business and, in particular, to a method and system for crawling multiple websites containing one or more web pages having information relevant to a particular domain of interest, such as details about local restaurants, extracting content from such websites, such as hours, location, phone number as well as reviews, reviewers, review dates and user tags and associating the extracted content with a specific business entity.

Since the earliest days of the internet, major search engines have used special software robots, known as spiders, to locate information and build lists of words, found across multiple websites, in order to provide search services to end-users. Google, Yahoo, AltaVista and Excite are each examples of well known generalized search engines. In order to populate their individual databases, each search engine uses a crawling mechanism, which operates transparently to the end-user, to gather information about individual websites and web pages.

In general, web crawling is the automated and methodical process of collecting content from multiple sites on the Internet. This collected data is then used by the initiating search engine to create an index that can then be searched by an end-user through a web-based interface. However, as the Internet expands to hundreds of millions of websites, and billions of individual web pages, the amount of content and number of pages that need to be discovered and analyzed, as well as regularly refreshed and reanalyzed, places a significant burden and high overhead, in terms of financial costs and data processing resources, on the search engines that process this information. In contrast, the instant invention describes a system that only extracts information relevant to the domain of interest, and offers efficiencies in cost and scalability for processing and presenting information.

While every generalized search engine works in a slightly different and often proprietary manner, typically, statistical-relevance based web crawlers, such as Google, Yahoo and other open source crawlers, index individual web pages as follows. First, when the search engine arrives at a website it looks in the root (main) folder of the site for a file called robots.txt. In the robots.txt file it looks for what directories and files it is allowed to look at and index. Once the crawler finds a web page, it takes a look at the head section (the tags between the <head> and </head> tags) of the web page for:

1. The title of the page
2. The keyword and description meta tags
3. The robots meta tag Web page content is defined as all content located between the <body> and </body> tags. This where the crawler looks for the keywords and phrases defined in the page's keywords and description meta tags. The crawler also finds and follows links embedded within the web page content. Typically a crawler reads the content in the order it is found on a page, from top to bottom. Generalized search engine spiders look at all the words in a web page and record where they were found, but each search engine has a different way at looking at the web page. For example most crawlers look at the <head> section of the html document and retrieve the <title> and <meta> sections. These sections are used to provide sufficient context through keywords and other instructions to permit the crawlers to process and organize the information retrieved. Most crawlers will also analyze all the words found on a page as well as click patterns generated by users accessing that page to determine which content on a web page is most relevant. Generally, page subtitles, image <alt> tags, text links and text link title tags are also used to infer the core substance of a web page. Finally, spiders from Google, Yahoo, MSN and other companies apply their own proprietary rules to organize and index the retrieved content.

While the concept of general search engines, and their value in searching and displaying information for consumer use, based on meta tags and keywords, has been refined by companies like Google, there is a new class of vertical search engines that focus on indexing and searching information in a targeted category of interest, such as local health care providers or travel information and planning resources. The concept behind these vertical search engines is to aggregate and organize information in such a way that a consumer will find it easier to obtain relevant information in one place and, more importantly, to provide a search experience where the results are limited to only that information relevant to a domain or category of interest.

The travel and real estate fields are each good examples of established industries where consumers rely on vertical search websites such as kayak.com, orbitz.com, and tripadvisor.com for travel searches, and zillow.com, and trulia.com for searches related to real estate. These sites organize information in a way that is more intuitive and specifically targeted for the type of transactions or time sensitive information a searcher may be looking for. Their value is also recognized by search engines such as Google, which index and rank these vertical sites highly due to the value they provide to consumers. As a result, a search conducted through a vertical search engine will generally provide a more focused, useful and richer consumer experience when compared to the same search conducted through a generalized search engine. For example, when conducting a simple search for a local business, such as a restaurant, in Google or Yahoo, the top ranked responses will typically be from those sites that have some relevant content, but will also likely contain much irrelevant information, forcing the user to construct a long and complicated search expression. In addition, because of the limitations inherent in keyword indices, there may be many local information sources containing timely and relevant content about the sought-after restaurant that should be considered by the searcher, but generally these sites will not be returned, regardless of the search query, since they are not easily indexed or integrated into the generalized database constructed by a statistical-relevance based search engine.

In addition, while browser searching has traditionally taken place at a desk in an office or at home, the proliferation of mobile computing platforms including cell phones and smartphones, such as the iPhone and BlackBerry, many of which include GPS or other location-determining technologies, has resulted in a class of mobile users who can benefit from a crawling and analysis method and system as taught by the invention, wherein a broad range of search results associated with a specific local business can be obtained. For example, as noted above, the best results for a local search query may not necessarily be keyword oriented, so traditional search engines, such as Google, which rely on meta tags and keywords and are not very capable of deep crawling such content automatically, will not do a good job of extracting relevant information and displaying it to the consumer. In addition, since websites are all constructed differently, statistical search engine strategies do not readily provide a scalable solution around this limitation.

By way of example, if we consider the case of a traveler accessing Google through their mobile phone to search for information about the best Italian restaurant in a particular city, their search may retrieve multiple pages of possibly relevant links, but there is no easy way for the consumer to analyze the results to arrive at an answer of what is the 'best Italian restaurant' with a high degree of confidence. In addition, an authority of what is 'best' in one area may not necessarily be an authority another, which is especially true in the case of local businesses, so a search strategy that works well for Italian restaurants in San Francisco may not work well for Italian restaurants in Chicago or London or Milan.

Some search engines, such as Google, attempt to provide a way for ratings and other relevant local business information to be accessed, but only if a user conducts their search though a dedicated local business search portal. However the results returned by these local business searches are generally limited to data "claimed" by the business owner, which may well be biased, or provided by a third-party content provider through some form of structured API integration with the search engine, such as the GoogleBase API. As a result, each of these search scenarios limits the information available to the searcher to only that which has been provided by an interested third party, and therefore also limits its utility.

Other search engines have attempted to permit the association of a website with a known business, but these systems do not provide a mechanism to capture information from multiple sources, both structured and unstructured, about a known local business and then extract the captured information and associate, or link the extracted information with the local business. One such example of such a system is that illustrated in US Patent Application 2005/0149507 to Nye. The Nye application is directed to identifying a URL address of a business entity by matching attributes about that entity, such as a phone number, to possible URL's and then selecting the URL that most likely is associated with that phone number, in a kind of reverse-webpage directory. While the Nye application talks about permitting a user to be able to look for local restaurants, for example, and discover their official web pages, this is a capability that already exists in search engines such as Google. However, Nye does not provide a consumer or business with the ability to search for, capture, extract and confidently associate information about a specific local restaurant, and associate only the relevant results with that restaurant from, across multiple sites, official, commercial and enthusiast, both structured and unstructured.

Returning to the discussion of searching for relevant review information in a mobile application while traveling, while its possible for a consumer to manually search each of the local review sites they are aware of to try and assemble a 'global' opinion about a particular restaurant, or cuisine, in a particular city, this process can be time consuming and, if a searcher is unaware of a particular site or blog, due to their unfamiliarity with the area, they may miss searching it completely. In addition, when a consumer is traveling and conducting a local business search through their mobile device, having to visit multiple sites to gather information is unacceptable. This problem is understood by the travel industry, where websites such as kayak.com or orbitz.com offer significant consumer value by aggregating airfares or hotel rates from multiple carriers or lodging providers. However, for consumer searches where opinion and review data is often as, or more, important than raw pricing information, the brute force method of aggregating information employed by kayak.com, for example, will not work.

As a result, it is recognized that when searching for local business information, such as local restaurant information, it will be very helpful to an end user, enhancing their search experience, to aggregate content from review sites such as citysearch.com, local.yahoo.com etc., together with professional reviews found on newspaper and media sites such as sfgate.com, nymag.com, sanfran.com, as well as with reviews from restaurant-related blogs such as Becks and Posh (becksposhnosh.blogspot.com) and discussion boards and forums such as chowhound.chow.com. Such a search engine is provided through the website BooRah.com which employs natural language processing technology to generate quantitative scores for domain specific attributes derived from plain English text, and further provides automatic summaries from the most relevant user sentiments to enable an end user to perform highly customizable search based on personal preferences. A key element of the BooRah search engine is a comprehensive database containing all of the kinds of content and reviews noted above, and therefore benefits greatly from the method and system for identifying, collecting, analyzing mapping and extracting relevant information, including reviews and opinions, as well as corresponding attributes, such as specific reviewer identification, review date and review rating associated with a specific local business, taught by the instant invention.

Accordingly, the need exists for an improved method and system for crawling, mapping and extracting information from web pages where the extracted information can be mapped to a specific business. The invention teaches a method and system that collects and extracts relevant information associated with a specific local business from multiple and diversified online data sources such as dedicated online review sites, blogs, newspaper and professional review sites and other types of discussion boards. The invention comprises a semantic crawling mechanism designed to identify and, if deemed relevant, to extract reviews, pictures, meta content and other domain specific attributes from those sites identified as being pertinent to a particular field, or domain, or interest. The invention further comprises an entity mapping mechanism that can associate the extracted content with an actual business, the results of such association enabling the population of a domain specific database that can then be used with a user-friendly search mechanism to allow an end user to search for relevant information about a particular search domain, such as local Italian restaurants, with a high degree of precision and ease.

BRIEF SUMMARY OF THE INVENTION

The invention is directed to a method and system for identifying, collecting, analyzing, mapping and extracting relevant information, including reviews and opinions, as well as corresponding attributes such as the specific reviewer identification, review date, review rating, menus, discounts, photos, videos and podcasts associated with a specific local business and/or a specific kind of local business, from multiple online data sources including professional review websites, community forums and blogs, and comprises a crawling mechanism and an analysis/mapping/extraction mechanism which operate in parallel. The method and system taught by the invention accordingly provides a scalable means to generate structured information extracted from unstructured web pages containing information about local businesses, from user generated content found on review sites and blogs.

By way of example, the invention can be used to populate a database with detailed information about local restaurants in a particular geographic region, such as the San Francisco Bay Area. In this application, the invention takes as an input a database containing names, addresses and telephone numbers of local restaurants, which can be collected manually and/or provided by companies such as Acxiom or Amacai. Each local business is assigned a unique Internal Business ID number.

The invention then employs a means to identify potential websites that may contain additional information about those local restaurants indexed in the database. The identification of such sites may occur manually, though the efforts of a 'domain specialist' who knows that, for example, in a particular city, the websites local.yahoo.com or citysearch.com are likely to contain relevant information about local restaurants. Such identification may also occur through an automated process, for example, by creating a Google Alert for each of the restaurants indexed in the database, and using the resulting RSS feed to identify web pages that reference a specific restaurant.

Using the website citysearch.com for the purposes of explanation, once the website has been identified as potentially containing information about one or more local businesses of interest, the invention incorporates a customizable crawling mechanism to navigate the site.

This specialized crawling mechanism is advantageous over generalized crawling mechanisms in that it effectively simulates the experience a human will have while looking at the same website, filtering out extraneous material, irrelevant links, graphics, advertisements, etc. This is accomplished through the use of a set of heuristically derived rules which allow the crawler to understand the structure of a particular website, including how a page devoted to a particular entity is laid out, and where on that page information about that entity, such as its address, hours, customer reviews, etc., may be expected to be found, and is an evolutionary step in the development of spiders that may parse a web page the same way a human would, and extract information from that page in a structured manner. As noted, this is advantageous over the automated spider techniques employed by Google or Yahoo whose systems are designed to see only keywords and limited information specified by designated HTML tags, and consequently crawl every website in exactly the same way. As a result, the web crawler of the invention can more precisely collect all the particular information about a specific business entity, but limit its efforts to the extraction of only the information related to that specific business entity and not to the collection any of the additional material, including graphics, advertising, etc., that may generally be found on web pages.

In practice, the specialized crawling mechanism is passed a seed URL of a web page, for example the main entry for a specific restaurant on citysearch.com, and the entire contents of that page are downloaded and stored. The stored contents are then analyzed according to the set of heuristically derived rules established for that particular website, and all the outbound links found on that page, meaning those links to other pages on the Internet that the current page has pointer to, are recorded. The construction of these links, their syntax in other words, is then examined to determine if they match the syntax previously identified as describing a link which points to an attribute of interest, such as the link to a review or the link to profile information about the specific restaurant, that we wish to explore further. Any link that is identified as being relevant is marked for deeper searching.

The specialized crawling mechanism also extracts a Source UID for the business entity being analyzed using the heuristically derived rules. The Source UID is similar to the Internal Business ID Number in that it is a unique identifier, such as a multi-digit number, which is used to allow a site, such as citysearch.com, to organize all those web pages associated with a particular business, in its internal database. Using the extracted Source UID in association with the heuristically derived rules, the invention can identify all those other pages, linked to by the current page, that contain the same Source UID. Since these linked to pages are referenced through the same Source UID they are therefore, by definition, pages that are related to the business entity being analyzed, and so those pages are also flagged for use as a seed page.

Using this process allows the invention to recursively identify all those pages, found within a specific website, and related to a particular business entity having the same unique Source UID, without requiring the business entity owner to 'claim' their page, as required by generalized search systems. This results in the ability of the invention to automatically build a comprehensive profile of all the pages on a website relevant to a particular business, without the need to thoroughly investigate every single page of the said same website.

Having collected the relevant pages, the next step is to commence the process of analyzing each stored page, mapping it to a specific business entity and extracting any desired content contained within that page. As noted, this process may run concurrently with the crawling process.

The analysis mechanism includes a mapping mechanism and an extraction mechanism, and the mapping mechanism begins by selecting a stored web page and retrieving all the content previously stored for that page by the crawling mechanism. A lookup is performed to determine if the selected page has already been mapped to a specific business entity, which may occur, for example, if a page has previously been mapped and is now being revisited to check for changes, additions, updates, etc. Assuming the page has not already been mapped, the invention employs an entity mapper that takes the stored text, and applying pre-processing and normalization rules, uses both a set of heuristic rules as well as a semantic processor to attempt to uniquely identify the business through information found within the stored text such as a phone number, business name, business address, zip code, and geo-coded coordinates. Geo-coded coordinates are the longitudinal and latitudinal coordinates for a physical business location.

The entity mapper uses this information to prepare a list of possible business entities and determines if there is a match for the current entity with a known entity in the input file containing the name, address and telephone number information about all local restaurants. This is done by analyzing all the possible matches between those known businesses and the multiple-possible identification outputs resulting from the pre-processing and normalization steps and, taking into account that multiple businesses may, over time, share the same address or phone number, as well as accounting for other anomalies that may be present either on the captured web page or within the local business database, the invention calculates a confidence score, matching the known entity with the extracted entity in accordance with a predefine set of threshold rules.

As a result, the Source UID can be matched to the Internal Business ID, and the invention can then apply that Internal Business ID to every other stored page that contains the same Source UID, significantly improving efficiency and cutting overall processing time.

Once the invention is able to establish a connection between the content retrieved from a website about a particular business (having a unique Source UID) and a known local business (having an Internal Business ID), the extraction mechanism operates to, where possible, extract any other useful information contained within the retrieved content. For example, in the case of local restaurants, it may be desirable to extract customer reviews of that restaurant and/or any numerical, letter or other score associated with such review. The extraction mechanism employs an extraction template, customized in accordance with the heuristic rules established for the website containing the content, and uses the template to extract desirable content which is then made available to any other process, subsystem or consumer that may wish to access such information. One example of such a consumer may be the System for Analyzing User-Generated Content described in U.S. patent application Ser. No. 11/982,936 and implemented on the BooRah.com website, where user-generated reviews and sentiments about a particular business, such as a restaurant, are collected and processed, regardless of their original publication format. The BooRah system requires, as one of its inputs, the extracted text of an individual review of a particular restaurant, and the instant invention can provide such text to enable the BooRah system to perform its sentiment analysis process.

Finally, after completing both mapping and extraction, the analysis process incorporates a hashing identification mechanism in order to generate a unique signature for the extracted text. This mechanism is used to determine when and how often the contents of an extracted page change, due for example to the addition of a new review or update of a previous review, in order to schedule further search by the specialized crawling mechanism.

As noted above, while the invention can crawl and analyze, map and extract relevant information from large destination websites, such as citysearch.com, it can also crawl, analyze, map and extract information from other types of websites, such as blogs, the details of which will be described in more detail below.

Accordingly it is an object of the invention to provide an improved website crawling and analysis system that can identify and associate a business reference and described on a web page with a known local business.

It is another object of the invention to provide an improved website crawling and analysis system that operates in a parallel fashion in order to increase processing throughput.

It is a further object of the invention to provide an improved website crawling and analysis system that can intelligently determine when relevant content on a website has changed and optimally schedule return visits in order to optimize the use of system resources.

It is an additional object of the invention to provide an improved website crawling and analysis system that incorporates heuristic analysis of the structure of a website in order to ensure that only the content related to a specific business is extracted and all the content related to a specific business is extracted.

It is yet another object of the invention to provide an improved website crawling and analysis system that can crawl and analyze information from both highly structured websites and user-generated blogs.

It is still another object of the invention to provide an improved website crawling and analysis system that can aggregates relevant information associated with any local business from a set of diversified data sources such as review sites, blogs, newspaper and professional review sites and other types of discussion boards and, additionally, extract of reviews, pictures, meta content and other domain specific attributes from these various sites which then can be presented to a consumer to deliver a rich and personalized experience.

It is still an additional object of the invention to provide an improved website crawling and analysis system that can rank content extracted from various sources based on geography using a technique that leverages a semantic understanding of the content and associating geo-relevance to it.

Still other objects and advantages of the invention will in part be obvious and will in part be apparent from the specification.

The invention accordingly comprises the features of construction, combinations of elements, and arrangements of parts, which will be exemplified in the constructions hereinafter set forth, and the scope of the invention will be indicated in the claims.

BRIEF DESCRIPTIONS OF THE SEVERAL VIEWS OF THE DRAWINGS

For a fuller understanding of the invention, reference is had to the following descriptions taken in connection with the accompanying drawings, in which:

FIG. 7A is an illustration of a sample entity mapping association process for a sample address where various tokens are analyzed to extract possible address, phone, website and business name information;

FIG. 7B is an illustration of a sample output of entities that are grouped as a result of the "Entity Grouping" process illustrated in FIG. 6 applied to the sample address of FIG. 7;

FIG. 9 is an illustration of a sample XML template used in connection with the extraction process of the invention;

FIG. 10A is an illustration of a sample XML template used in connection with the crawling process of the invention;

FIG. 10B is a continuation of the illustration of a sample XML template as shown in FIG. 10A;

FIG. 10C is a continuation of the illustration of a sample XML template as shown in FIG. 10B;

FIG. 12 is a table illustrating a sample extraction template used in connection with the process of extracting relevant content from a blog in accordance with the invention.

DETAILED DESCRIPTION OF THE INVENTION

Figure 1:
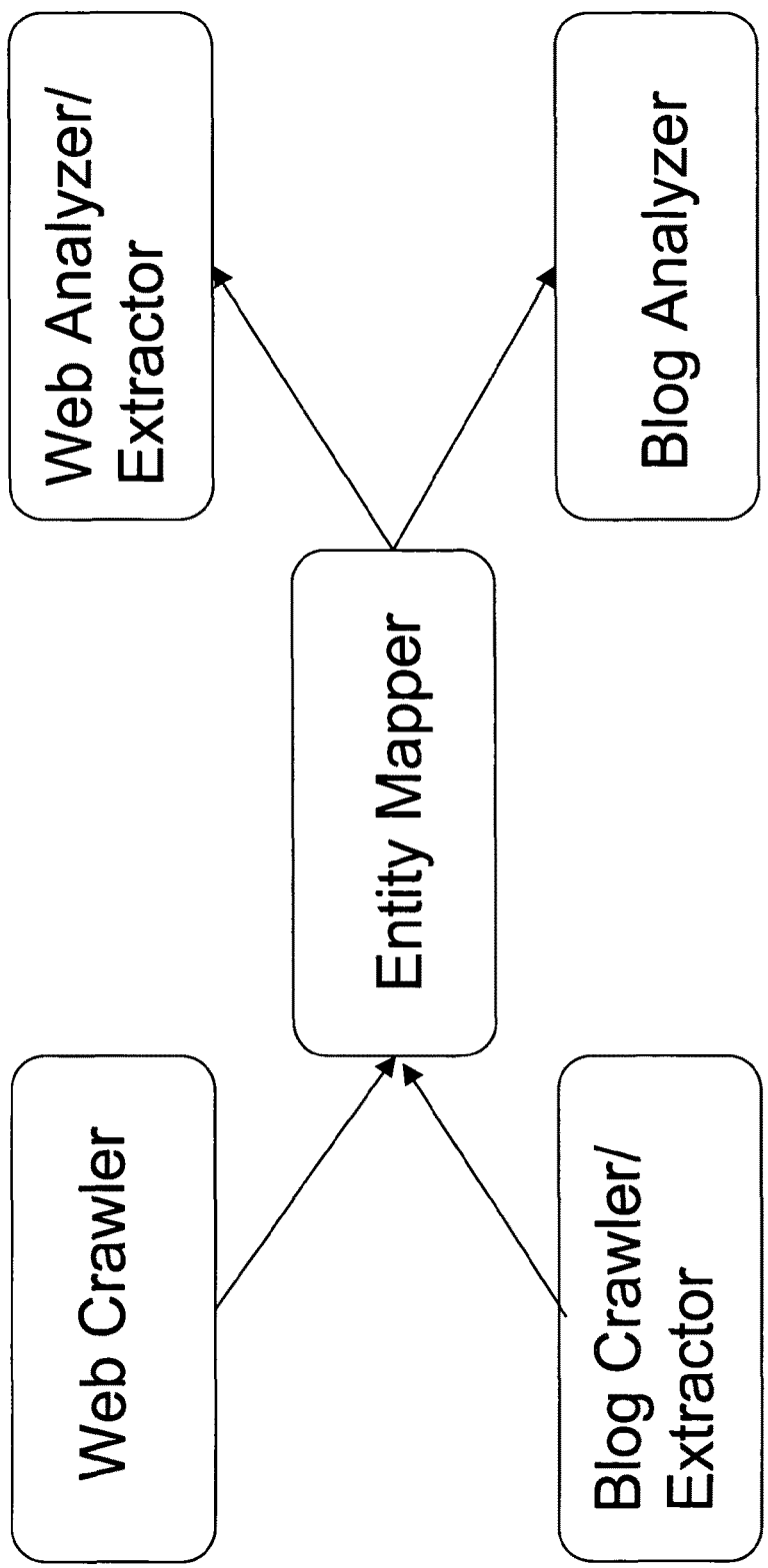
FIG. 1 is a block diagram of the architecture of the instant invention.

In the detailed descriptions of the embodiments of the invention that follow, like reference numerals refer to like components in the various views, in which there is illustrated several embodiments of a new and improved method and system for crawling, mapping and extracting information associated with a business from multiple websites using heuristic and semantic analysis.

The invention is defined as employing heuristic and semantic analysis and, in the context of the invention, this is understood to mean that the method and process of the invention develop and employ an ontology and dictionary of terms associated with a given domain, such as restaurants, which are then used to instruct the invention in its process of gathering information about a local business. As a result of the use of this type of analysis, the invention can focus on collecting information that is most likely to be associated with a local business, as opposed to the results returned by a simple statistical keyword search.

This invention also employs the use of many rules of thumb, common abbreviations, data forms and conventions, as well as industry specific business processes and how they are used, to create a method and system that can crawl, map and extract information associated with a particular business from multiple websites. The use of these rules, conventions and teachings in association with the practice of the invention is collectively called "heuristics". Similarly, the instant invention employs the teachings and use of the elements of the invention taught in U.S. patent application Ser. No. 11/982, 936, System for Analyzing User-Generated Content, in order to understand the meaning and context of various words used in the English language. These teachings and rules pertaining to processing of such data are referred to as "Semantic Analysis" or simply "Semantics".

In addition, while the instant invention teaches a generalized method and system for associating, or mapping, content found on multiple websites with a specific business, and, in particular, to a method and system for identifying, collecting, analyzing, mapping and extracting relevant information, including business hours, location, telephone number, reviews and opinions, associated with a specific local business gathered from multiple online data sources, both structured and unstructured, including professional review websites, community forums and blogs, and can be applied to the collection and analysis of various domains of interest (such as restaurants, physicians, hotels, etc.), the detailed description provided below will use the domain "local restaurants" as an example, and the crawling and analysis of websites will be limited to those containing restaurant listings, information and reviews, as well as blogs which write about restaurants or food. For the purpose of understanding the invention, review sites are websites where consumers review local businesses within a format pre-defined by the structure of the site, such as citysearch.com and yelp.com. Review sites also include websites that publish professionally written reviews such as websites for newspapers, lifestyle magazines and the online editions of guidebooks, which review local businesses on a regular basis. Blogs are unstructured websites where end-users, who are usually dedicated and passionate but non-professional reviewers, regularly evaluate local businesses, such as restaurants, applying their own insight and developing a reputation and authority on the basis of their experience.

Referring first to FIG. 1, a top-level block diagram of the crawling and analysis architecture of the invention is shown. As illustrated, the invention comprises the functional blocks of a web crawler and a blog crawler/extractor, each of which operate in parallel, and independent of each other, and each of which act as web spiders, or robots, to visit previously identified websites and collect information about local provide their results to an entity mapping mechanism. The entity mapping mechanism processes the data provided by web crawler and blog crawler/extractor and for each entity, or business, it applies a set of heuristic rules and semantic analysis to associate the collected content with a previously identified local business. Once the contents of a web page have been mapped to a specific entity by the entity mapper, the contents are then processed by the web content analyzer/extractor or blog content analyzer, depending on whether the original source of the content was a structured web page or a blog.

In FIG. 1 web crawler refers to a mechanism that navigates pre-identified sites and stores relevant links and paths to actual content that will then be mapped to a businesses entity and extracted for use by another program, process, individual, etc. URLs for web pages that contain content of interest about a local business are identified, and these URL's are recorded for web crawler to process. The crawler collects the content of interest for later analysis and provides a reference pointer for the collected content to the entity mapper. In a preferred embodiment the entity mapping process will only happens when a new URL is encountered during the crawling process.

FIG. 1 also illustrates an alternate input to the entity mapper, which enables the invention to effectively process information found on blogs. Blog crawler/extractor refers to a mechanism, similar to the web crawler 100 but optimized for retrieving content from blogs, that subscribes to relevant blogs and notification services, such as Google Alerts and Bloglines notifications, to receive updates about keywords contained in new blogs, published on the internet, that correspond to businesses of interest. As soon as the blog crawler/extractor receives notification of a relevant new blog publication, it extracts the content from an associated RSS feed and provides a reference pointer for the collected content to the entity mapper. Unlike the web crawler, the blog crawler/extractor process requires that the entity mapping process is performed for every new blog post of interest as different entries in the same blog may frequently describe different businesses or topics.

As noted, entity mapping is the process of associating content found on a web page with a local business that has previously been identified and indexed in a local business database. Typically such business listings are procured from a Yellow Pages data provider such as Acxiom or Amacai. Once a web page is mapped to a business entity, configuration parameters such as a refresh rate, specifying how often the same page should be revisited to check for new or changed content, and type of information to be extracted from the collected content are established. The content collection process occurs each time a web page is visited by a crawler of the invention, and important meta information is collected from the web page on each visit. Since it is possible that only a portion of the content of a page will changed or be updated at any given time, the invention incorporates logic to prevent the duplicate collection of the exact same content. While web page crawling and blog crawling go through similar steps in collecting content, blogs are, in general, more unstructured in how their contents are published, and are also more likely to contain 'spam', so some of steps necessary to collect and analyze blog content differ from those employed in the crawling and collection of structured web pages, and the blog crawling process will be discussed in more detail below.

Figure 2:
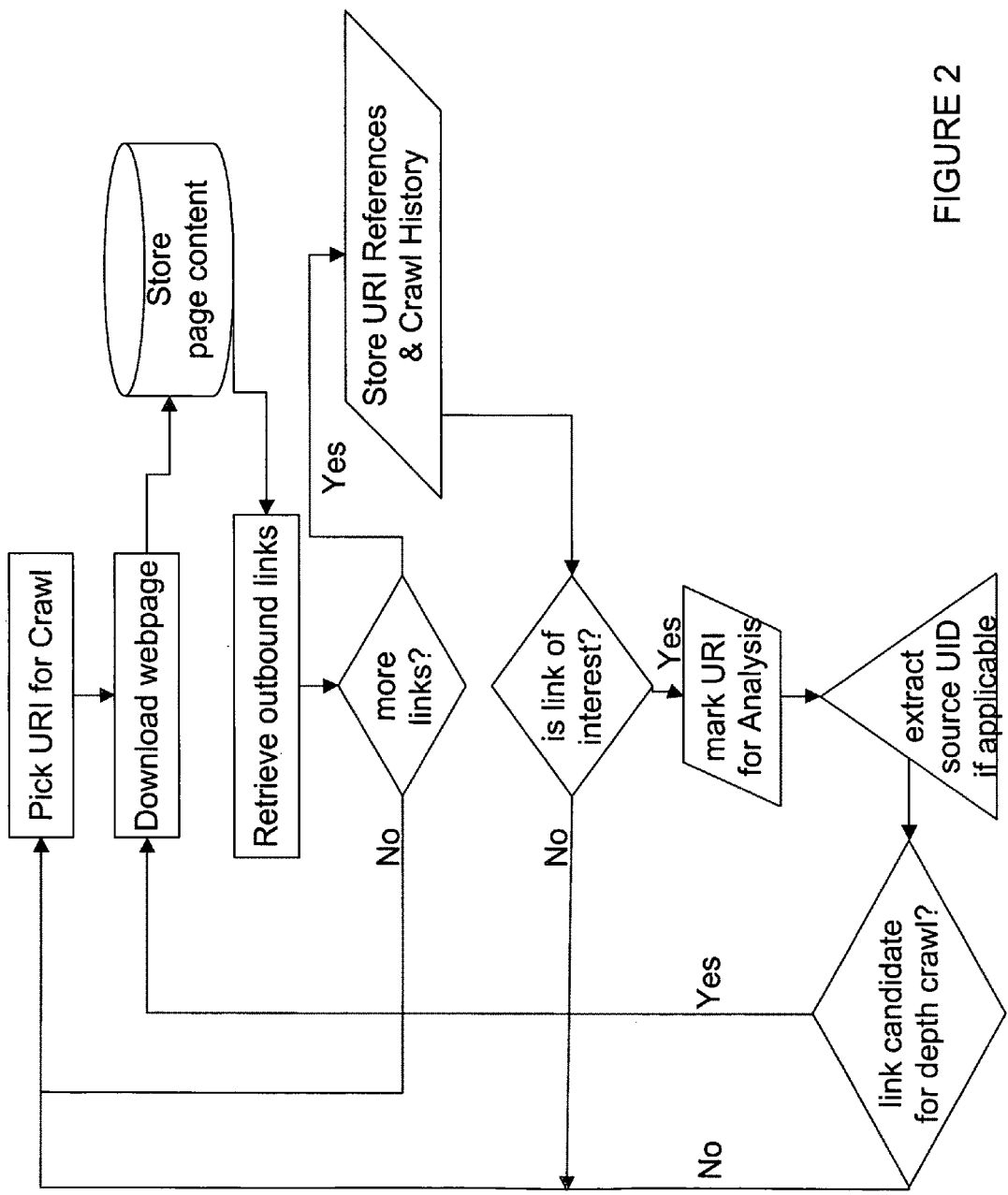
FIG. 2 is a flow chart illustrating the crawling process of the invention applied to a specified URI.

Turning, then, to FIG. 2, a crawling process in accordance with the invention is illustrated. The crawling process begins with a database of web page addresses that are expected to contain content relevant to the domain or field of interest. These addresses may be generated by an analyst who is knowledgeable about which websites may be most relevant to the subject matter within a particular geography of interest. They may also be generated automatically through the use of generalized searching and analysis tools, or some combination of the two techniques. The crawling process is scalable and can be used for deep crawling websites that have 100,000's of URLs. As such, the crawling process of the invention is advantageous over standard crawling techniques in that its framework provides the ability to add content mapping and extraction rules either through the use of human input or by generating such rules automatically through a mechanism of heuristically driven content analysis. Further, the invention comprises the ability to 'understand' the content of a web page by recognizing content patterns found on a particular website, and using these patterns, or templates developed from such patterns, to extract different data elements from a web page on that website and automatically associating that web page with an entity or business. Such extraction of content from websites within a specific domain is an important element in the field of semantic web searching, and a unique aspect of the invention. For example, such ability can be used to link all the content associated with a local business with an indexed listing of that business. This is a concept known as "geo-indexing" and is used to provide a link from content found on the Internet to actual companies that have physical presence, mailing address, phone number, etc.

To better understand the difference between the results provided by a traditional crawling mechanism and the crawler of the invention, we can examine a specific example of local business such as the Three Seasons Restaurant in Palo Alto, Calif. A simple search of "three seasons palo alto" in Google will bring up the first page of relevant matches, each of which will have some combination of the four keywords identified within them. However, reviewing such a search we can see that some of the results returned are references to URLs that are not really associated with this particular restaurant. Repeating the same search using Google local search (local.google.com) yields a fairly good blend of deep content that has been extracted from websites that provide reviews and information about the restaurants. So Google appears to have successfully "geo-indexed" this content. However, a closer inspection of the results shows that the review snippets are pulled from multiple restaurant review focused websites including Zagat and Kudzu. However, while Google provides a link to access the complete review from each site, a consumer is faced with the challenge of having to navigate across multiple sites to determine which one is most relevant, timely, etc. In addition, in order to get access to reviews that may appear in individual blogs, the user needs to go to yet another Google site (blogsearch.google.com) and search for blog entries on "three seasons palo alto". Again this yields results that have some keyword matches but not many relevant pieces of information. This inherent complexity of integrating each of these search sources can be obviated by the invention through the use of semantic crawling to obtain content, and the process of associating all relevant content uncovered to a specific business using the process taught by the invention.

Therefore, returning to FIG. 2, the crawling process starts by identifying websites that contain relevant information about business entities in a particular domain or vertical market. As noted, for the restaurant domain, some well-known sites that contain reviews include tripadvisor.com, citysearch.com, yelp.com, and gayot.com. Each of these sites are dedicated to capturing user content for multiple domains, meaning these sites publish not only restaurant reviews, but hotel reviews, automotive services reviews, specialty shop reviews, etc. The domain analyst starts with one of these sites, such as citysearch.com and identifies how the site is structured, how pages branch to other pages, how individual businesses are identified, etc. By browsing a number of restaurant reviews on the site and performing some analysis of the underlying html code that describes the website, it is possible to identify a series of patterns and rules that globally define content of interest.

Turning to FIG. 10A, FIG. 10B and FIG. 10C, a sample XML template used to identify domain relevant information during the crawling process is illustrated. The sample template defines a set of rules, each bounded by a <row></row> tag pair, used to identify the construct of a possible unique web page link, or URI (Universal Resource Indicator), as used within the citysearch.com site, while each column represents an attribute that may be attached to such URI. The <regex> parameter represents a URI Regular Expression and shows, by way of illustration how the Business Profile, Business Review and Business Yellow Pages aspect of each entity can be accessed. In practice, the crawler will visit each of the URI's defined. In the sample XML illustrated, the <source_uid_regex_group_num> parameter indicates the position in the URI that represents the Unique Source UID (UID) of a particular business listed in the citysearch.com domain. By way of example, a UID might be 45505819, which represents the unique number assigned to the business entity "The Counter" restaurant in Palo Alto, Calif. Each review site will assign a different UID to each business it tracks, and the UID for a particular business will be different on every site. Therefore, one important aspect of the invention is the ability to be able to map the different UID's assigned to the same business by different websites, to a single, Internal Business ID Number that is positively associated with an actual business at a physical address. Parameter <map> is a flag that indicates whether the invention should map the specific URI to a business. Parameter <extract> is a flag that indicates whether a URI contains attributes or data that will be of interest, and therefore should be collected by the invention. In the case of a citysearch.com profile this flag will indicate that the web page discloses attributes such as hours of operation, pricing information, etc. that will be valuable to capture. Parameter <biz_profile_uri> is a flag that indicates whether a URI denotes the main profile, or top-level page for a business. Parameter <xslt> provides an extraction template, which is an XSL file template that defines the content extraction rules for the page. And Parameter <do_depth_crawl> is a flag that indicates to the crawling mechanism of the invention that a web page having this kind of URI should be inspected to see if it contains other URI's of interest, matching one or more of the other URI Regular Expressions listed and therefore recognized as belonging to the same business entity, and scheduled to be more deeply crawled immediately. Finally, Parameter <leaf_node> indicates to the crawler that the content on these types of URI's have content that typically do not change over time (for e.g., an individual review page) and therefore do not need to be refreshed periodically.

Returning to the flowchart of FIG. 2, a seed URL is provided to the crawler in the step, Pick URL For Crawl, to initiate the crawling process. A sample URL might be:

http://siliconvalley.citysearch.com/find/section/siliconvalley/restaurants.html

This is a link that contains deeper links to thousands of other businesses (restaurants in this case) on the siliconvalley.citysearch.com site. The information about the extracted URLs is represented in the following format:

Every URL within the system can be identified by one or more unique properties to enable the crawler to effectively organize the crawling process. For example, a URL can be identified by a unique sequence number, also known as the Internal Business ID Number, and a simple message digest hash that is computed for every URL searched by the system and helps in quickly determining whether a page has changed since the last time it was crawled, and can be used to determine how frequently that page should be crawled in the future. In addition, each URL can be assigned a Priority that can be used to identify which URL's the system should crawl first. State is a flag that indicates whether a particular URL has ever been crawled before by the system. Each URL is also identified by a State that may take the form NEW, PROCESSED or EXTRACTED. When visited for the first time, the State variable starts in a NEW state transitions to a PROCESSED state in the case of a URL for a web page that does not contain any relevant content to be retrieved, but instead contains one or more links to other, deeper and more valuable, URL's, which will also be crawled. Deeper links that are identified as containing relevant content to be captured have their State changed from NEW to EXTRACTED. If there is an error in processing a URL, the URL State variable can also be assigned an error code.

Returning, then, to the examination of the crawler flowchart of FIG. 2, the invention begins by picking up a URI that's ready to be crawled. Using standard crawling techniques, the content of the web page designated by the URI is collected and stored on a file system. Once a page is collected, the crawler retrieves the list of outbound links referenced on that page. Each link is inspected and marked for future crawling only if the format of the link matches the construction of the of the Regular Expression URI's listed in FIG. 10. The crawler then extracts the Source UID from the URI. If this URI is marked for depth crawling, for example the URI is the top level URI for a particular restaurant, then the crawler proceeds to immediately crawl outbound links that have the same Source UID as the current URI. This allows the crawler to build a complete index of links relating to a particular business quickly.

As can be seen, the invention does not crawl an entire site layer by layer; moving deeper only after the current level has been exhausted. Such a breadth-first approach cannot guarantee business profile completeness. Similarly, the invention does not deep-crawl every possible URI link found, as such a strategy would not be computationally efficient. Rather, the invention is an improvement over existing crawling techniques that are fundamentally keyword driven and breadth focused. The method and system of the invention overcomes the statistical crawling methods of major search engines and extracts highly targeted content in an expedited fashion.

To further explain this breadth-depth combination crawling mechanism, we can consider how the invention would process a citysearch.com URI in the form:

http://sanfrancisco.citysearch.com/profile/40867522/san_francisco_ca/slanted_door.html Once the content of this page is collected, the crawler's algorithm initiates crawling the review listings page for Slanted Door in accordance with the Regular Expression URI for the top-level review page:

http://sanfrancisco.citysearch.com/review/40867522

Each of the individual review pages for the Slanted Door can then be identified as comprising the same Source UID as the Slanted Door, for example the review located at:

http://sanfrancisco.citysearch.com/review/40867522/3355641

Any URI's that do not match one of the specified Regular Expression rules will be deemed of no interest, and therefore not searched. This ability to build comprehensive profiles for a business allows the invention to be used to offer value-added services, such as an online reputation management service, to individual business owners without requiring that business owner to 'claim' their listings on each search engine, as required by local search engines such as Google Local Listings and Microsoft Live.

As noted, the invention comprises both a crawling mechanism and an analysis mechanism that is capable of performing both entity mapping and content extraction. As illustrated in FIG. 1, the web crawler operates independently of the entity mapping mechanism, which itself operates independently of the web extraction mechanism and blog extraction mechanism. By independent it is meant that each of these processes may run in parallel, to increase the throughput of the system. However, for the purpose of describing the invention, reference is made to FIG. 3, which illustrates an analysis mechanism comprising both an entity mapping system and content extraction system and is called once one or more websites have been crawled by either the web crawler or blog crawler.

Figure 3:
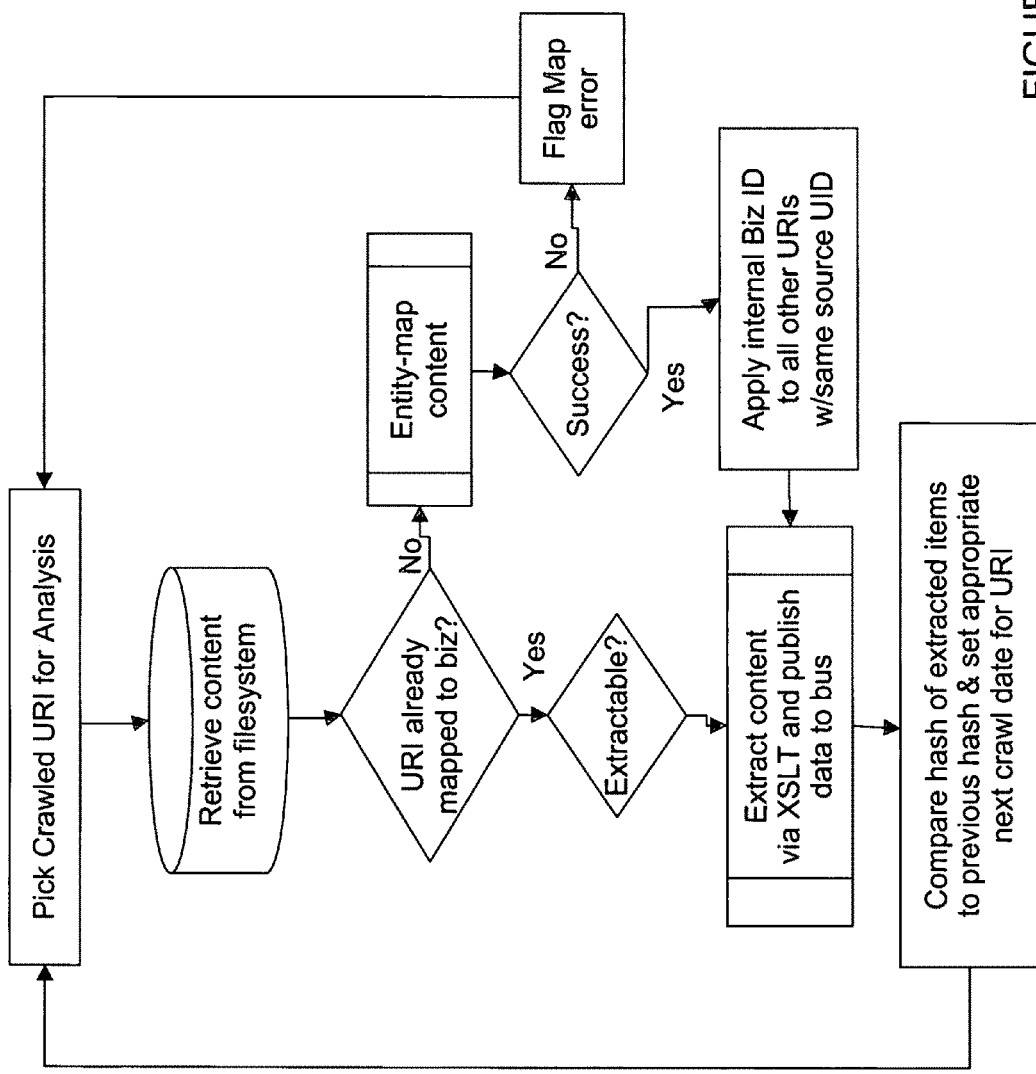
FIG. 3 is a flow chart illustrating the analysis, mapping and extraction process of the invention applied to a previously crawled URI.

Beginning at the top of FIG. 3, the invention selects a URI for analysis. In practice, this is a URI that has previously been crawled and stored in the system's file system in accordance with the process illustrated in FIG. 2. In FIG. 3 once the URI has been selected and content retrieved from the file system, the URI is checked to see if it has previously been mapped to a particular business. This can occur if a particular URI has been analyzed before and is now being checked for any updates or changes to the content of that URI's web page.

Figure 4:
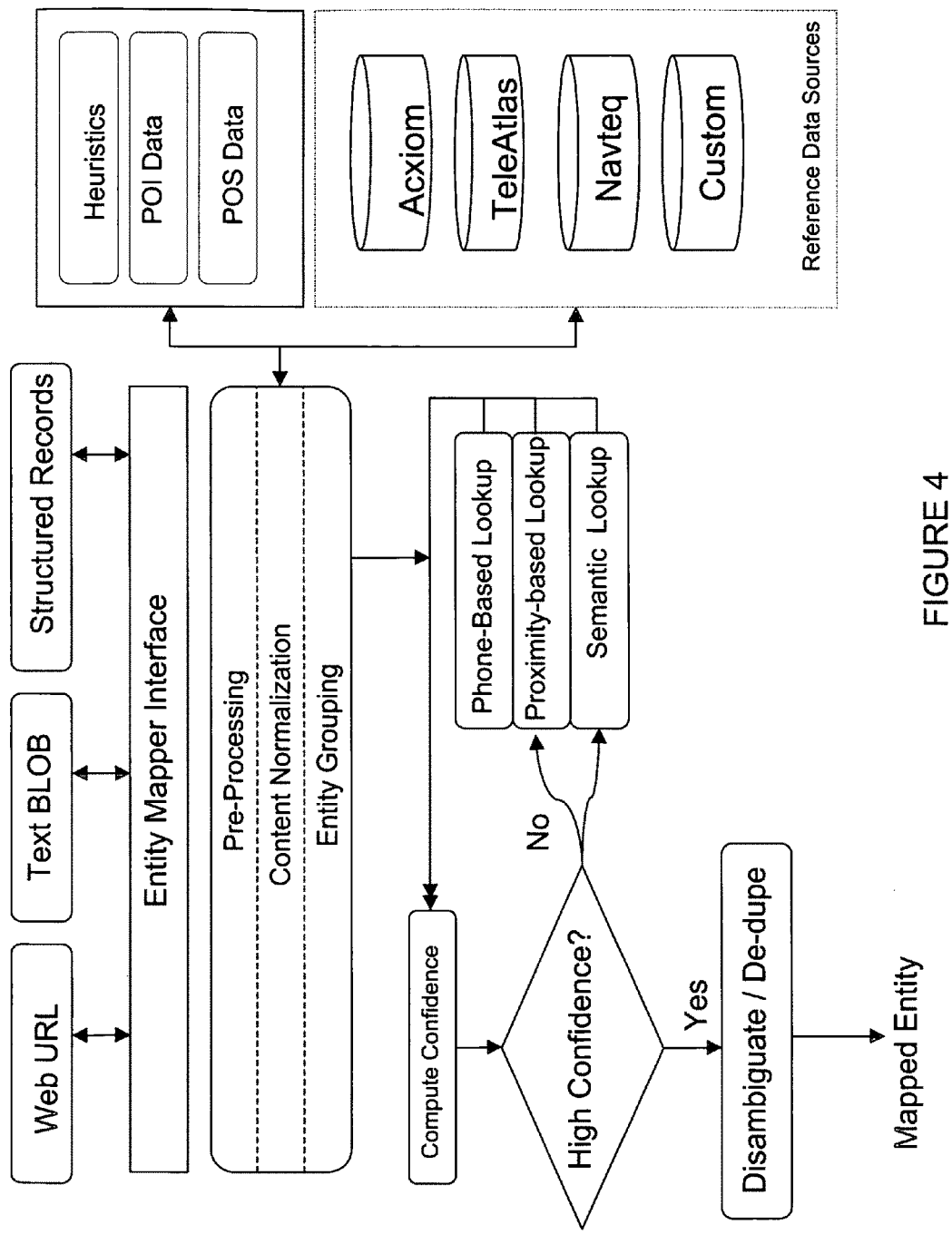
FIG. 4 is a block diagram of the "Entity Map Content" architecture as shown in FIG. 3.

If, however, a URI hasn't been mapped previously, the invention then passes the crawled and stored content to the entity mapping subsystem, the architecture of which is illustrated in FIG. 4.

As can be seen in FIG. 4, the entity-mapping subsystem supports multiple query interfaces, including the direct entry of a website URL, the input of some number of characters of text extracted from a website, known as a text blob, or the entry of structured data submitted, for example, through a published API. The entity mapping subsystem processes this information and outputs the identification of the local business entity that matches the information submitted.

Examples of input that are supported by the entity mapping system include:

http://local.yahoo.com/info-34861386-the-counter
OR
369 South California Avenue, Palo Alto, Calif., 94306
Phone: 650-321-3900
website: http://www.thecounterberger.com
OR
The Counter, 369 S California Palo Alto 94306
OR
The Counter in Palo Alto As illustrated in FIG. 4, the Entity Mapper Interface communicates with a pre-processing/content normalization/entity grouping mechanism to transform the data, in whatever format submitted, into a standardized format that can be mapped to a local entity.

Figure 5:
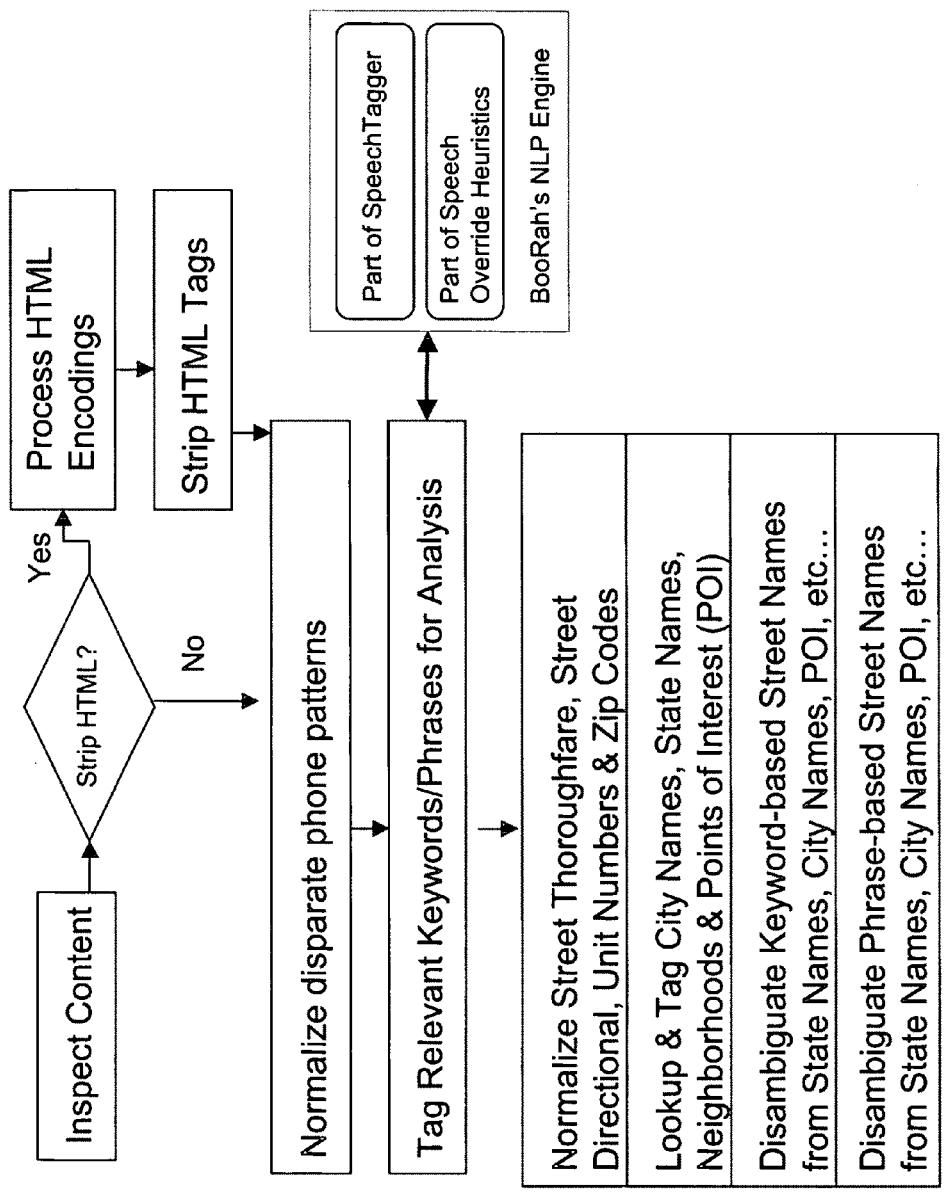
FIG. 5 is a flow chart of the "Pre-Processing" and "Content Normalization" processes as shown in FIG. 4.

A flowchart of the Pre-Processing and Content Normalization mechanism of FIG. 4 is illustrated in detail in FIG. 5. The pre-processor can be explicitly instructed to strip html tags, or keep them intact depending on whether the html tags are known to comprise fields that may be useful in mapping the entity to a local business. For example, many blogs and websites contain the name of the business, city and state embedded within the title section of the html page, so preserving those html tags may be helpful in improving the confidence of entity mapping. In a typical application of the web crawler the html tags are not useful and therefore stripped and clean content is extracted, whereas for the blog crawler/extractor, the html tags are normally preserved. Next the content is inspected and various possible formats of telephone numbers, such as xxx-xxx-xxxx or (xxx) xxx-xxxx, etc, are searched, identified and normalized into a single recognizable format suitable for further processing. At this point extra white space characters are deleted and any character encodings are properly translated.

Once a normalized phone number is extracted, the invention processes the remainder of the text blob to search for relevant keywords and phrases that may be analyzed to identify the business entity. The text blob is passed to a natural language semantic processor of the kind shown in U.S. patent application Ser. No. 11/982,936, having the same inventors as the instant invention. This processor is able to identify the proper grouping of text based on meaning, and employs a sub-component, called a "Part of Speech" (POS) Tagger. The POS Tagger tags each word, or group of letters or digits bounded by a space or period or other grammatical mark, with a plain English parts of speech tag such as COMMON NOUN, PROPER NOUN, VERB, ADJECTIVE, etc. Each of these tagged words, groups of letters or digits is referred to as a token. After the POS Tagging stage is complete, certain domain heuristics are applied that may change the part of speech so that it is more likely relevant to the type of business the mapped entity engages in. For example, in analyzing a text blob extracted from the profile of a restaurant that serves "Persian" cuisine, the word 'Persian' would initially be tagged as an ADJECTIVE, but for the purposes of entity mapping, it will be overwritten as NOUN (as in type of food is PERSIAN) since the rules of the natural language processor applied to the restaurant domain would indicate that the regional identity of a person is far less likely to be relevant when describing a restaurant, than a type of cuisine. This override mechanism is applied to all words that may be tagged as NOUNS and therefore applied to any words that may be considered candidates in the identification of street names, city names, business names, etc.

Once the natural language processing is complete, tokens are sorted in order of relevance and importance for the purposes of entity mapping. Examples of tokens that may be resolved are:

94306/DIGIT—this could be ZIP or STREET NUMBER OR UNIT NUMBER 650-321-3900/DIGIT—this could be PHONE or FAX 369/DIGIT—this could be STREET NUMBER or UNIT NUMBER California/NOUN—this could be STREET NAME, RESTAURANT NAME, STATE Once each of the tokens in a particular text blob are identified and tagged with possible identifiers, further disambiguation of the tokens takes place. The invention employs both proximity logic and heuristics developed in accordance with the knowledge of how addresses are defined in the system, to group a collection of these tokens together to identify a potential local business entity.

Figure 6:
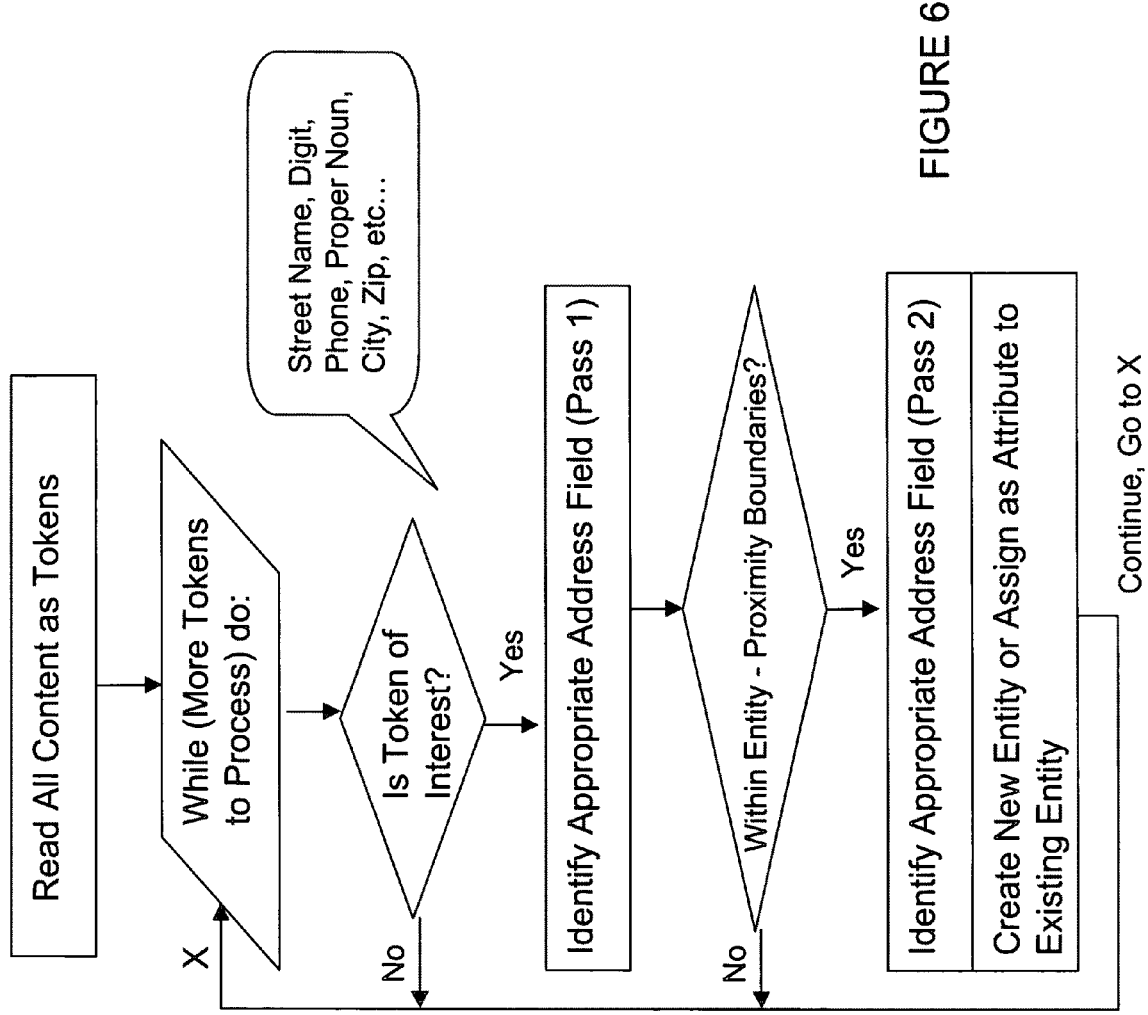
FIG. 6 is a flow chart of the "Entity Grouping" process as shown in FIG. 5.

Referring to FIG. 6, a flow chart illustrating how each token is processed and attributes are associated. Each token is processed in sequence to determine if the token corresponds to one of the elements useful in determining the physical location of a local business. For example, every local business, such a restaurant, can be associated with certain corresponding attributes such as street number, street name, city name, zip code, phone number, website address, etc. If a token is a digit or can be resolved to a numeric value, then it is evaluated to see if it may represent a valid zip code or a street number. A typical address listing has street number preceding the zip code, so in the absence of both the fields, a digit is tagged as street number and stored as an attribute of the particular business entity. Similarly, if a token is a proper noun, then it may be a street name, city name or something else. The system checks each token to see if it matches the name of a city located within a desired geography. If it matches a city, it is so tagged. Similarly, each token is evaluated and tagged for every other possible attribute corresponding to the listing of a local business. When no match can be made for a token against known possible values, that token is tagged "UNKNOWN" for disambiguation later on. It is understood that during this evaluation process a token could be tagged with multiple attributes in connection with a group of local businesses. Therefore, in determining how to properly identify the meaning of a token, proximity heuristics for the domain defined and used. For example, if a state name is encountered before a city has been detected, then that token is treated as a possible street name token and not a state token. Similarly if more than certain number of words separates a street name and city name, they are considered to belong to two entities, and not a 'single' token. The output of process illustrated in FIG. 6 is a list of such grouped entities, which may contain varying number of attributes for a business listing. This list is reconciled with the actual list of known business listings sources such as Acxiom, TeleAtlas, Navteq and Amacai.

Applying the process described above to a specific example, FIG. 7A illustrates the application of the invention to an address listing found on a website. The top of this figure illustrates the input to the entity mapper is a text blob contained between "start of webpage" and "rest of webpage", while the bottom of the figures illustrates various tokens being detected and, ultimately, assigned to the proper address field of the local business being analyzed. In FIG. 7A, the parsing of each token is illustrated. Possible assignments are shown as being separated by a pipe ("|") character, while empty fields are denoted by two hyphens ("-"). As shown in the sequential flow, the system first identifies the phone number pattern (650) 321-3900 and creates a new entity with that phone number. It then detects a digit, 369, and assigns it as a street number for the same entity. The next token "S" is inferred as a street directional and assigned accordingly. The next token, "California" may be construed as a state name, but employing the proximity heuristics of the invention, it is recognized that a city has not yet been determined and therefore the invention infers the token to be a street name, "California" and not a state. In this manner all the tokens relating to the business entity are analyzed from the text blob and the result is compared to the actual list of known businesses to determine a potential match.

As discussed above, and as can be seen in FIG. 7A, analyzing a text blob may result in multiple business entities being potentially associated with the extracted content. We know, for example, that typically a web page related to a particular business will display that businesses address and other information about that business, but there may be other advertisers and/or related business that will also be displayed on the same page. We also know that the Yellow Pages databases available for purchase contain numerous errors including typographical errors, stale data, etc. Therefore, as indicated above, the output of the entity grouping process is a list of all possible such identified businesses, and the invention must then disambiguate multiple entities identified during this process in order to specifically identify the particular business entity that is the subject of the text blob. FIG. 7B illustrates multiple such entities extracted from process illustrated by example in FIG. 7A. As can be seen, some grouped entities contain many attributes and some very few. For example, the webpage on yahoo.com for the restaurant "The Counter" in Palo Alto also contains references to the British Bankers' Club and Laurel Quality Cleaners, both local businesses nearby The Counter and, therefore, advertisers on the same page. As a result, both the British Bankers' Club and Laurel Quality Cleaners are identified as possible entities on the web page being processed.

Figure 8:
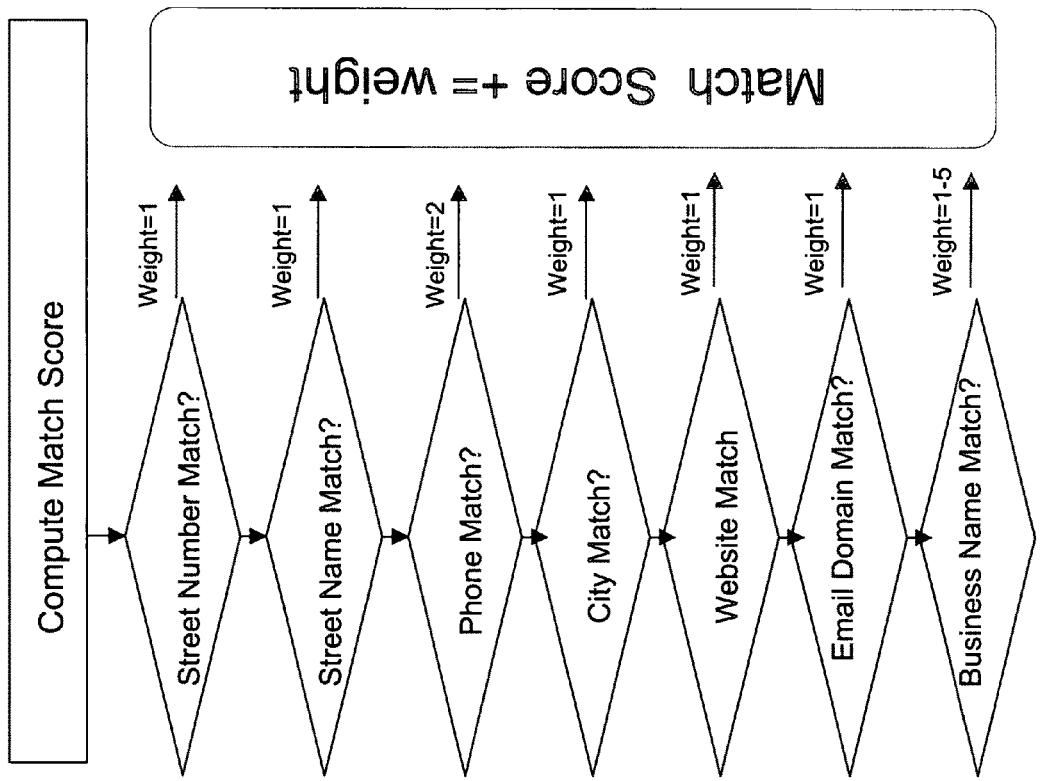
FIG. 8 is a flow chart illustrating a mapping confidence computation process in accordance with the invention.

As shown in FIG. 4, each entity that is output by the entity grouping process is matched against the internal database of businesses, where tokens, such as phone number, zip code, city, state, street name, street number and website address are used to perform matches. Referring next to FIG. 8, a mapping confidence computation process is illustrated, and shows how the matching of tokens to identification attributes of possible business entity matches will contribute to the establishment of higher confidence level for only one of the possible entities. While business attributes such as street name and city contribute a base score of 1 to the overall confidence, each city, and each street in each city, may have more than one local business, so matching these attributes is generally not dispositive to the identification of a specific business. On the other hand, matching more business-specific attributes, such as the businesses' phone number or business name, contributes more to the confidence that the right business has been identified. In the preferred embodiment of the invention, a phone number increases the confidence score by 2 and a business name match could increase the score between 1 and 5 depending on the number of words that match in the target business entity. A confidence score is computed for each possible entity match returned, with the net result of the process being a list of entities sorted in descending order by confidence. In practice, the typical output of such confidence processing is a single entity with a very high confidence score and multiple other possible entities, each with a lower confidence score. Assuming only one entity has the highest score, that entity is mapped as the matched entity for that text blob, web page, URL or other input. However, as can also be seen in FIG. 4, if a phone number match fails or a phone number is unavailable, then each of the possible entity matches are geo-coded to a location using a proximity based lookup process. This is possible where a geo-codeable address is present in the text blob being processed. For example, using spatial search techniques, businesses physically close to a geo-coded location are fetched from the local business database, such as ACXIOM, and matched to see if any return a confidence level similar to that returned by a phone number match. If the system cannot geo-code an address, then it conducts a semantic lookup and analysis using the actual content extracted, and attempts to match references to local businesses within the named location.

This option can result in an exhaustive search process and is, therefore, more lenient in its proximity requirements. This is typically the case with blogs where information about local businesses and their locations are within a narrative and not structured as in the case of review sites. Therefore, system is built to be flexible in adjusting to the chronological order of any attributes associated with business listing. For example, a blog which contains the sentence "I had a great meal at Joe's Pizza in the Mission District in San Francisco" would result in the system looking for the business entity Joe's Pizza in a known neighborhood, the Mission District, which the system recognizes is a neighborhood in San Francisco, which is itself a known city. This semantic extraction and confidence computation technique is especially useful in parsing blogs or messages posted in online groups, which are often less structured in how they are written and organized.

Returning to FIG. 3, we can see that once the entity mapping process is complete, it checks to see if it has been successful in mapping the selected URI to a local business entity. If this process is successful, then the invention applies the Internal Business ID Number assigned by the invention to all other URI's that comprise the same Source UID. In this way, it is not necessary to pass every URI through the entity mapping process, but only those that have not already been assigned an Internal Business ID Number.

Upon successful completion of entity-mapping process, the analysis mechanism then determines whether the stored content from the selected URI is extractable and, if so, whether it is of interest to associate the stored content with the particular business entity. As noted above, such content may include business reviews, numerical scores for various aspects of the business, such as price and service, etc., and it may be desirable to extract these elements and provide them to the actual business owner, for example, or to an aggregation engine, such as that presented on the BooRah.com website.

If it is desirable to extract the content the invention then loads an appropriate extraction template, which is similar to the crawling template illustrated in FIGS. 10A-10C, and extracts the desired data. As can be seen in FIG. 9, the extraction template is a generic atom/RDF compliant XML file that identifies, with minimal dependency on a web page's HTML structure and hierarchy, the extractable content contained on a web page. Each website, such as citysearch.com, will have its own extraction template customized to the information available and formatting used on that type of webpage. Using web page analysis and domain specific text heuristics, similar to the Regular Expression URI illustrated in FIG's. 10A-10C and used to guide the operations of the crawler mechanism, the extraction templates can be automatically generated once enough pages from a particular source has been crawled to recognize how pages from that source are constructed. The extracted data is published to a data-bus, or stored on a server, where interested domain consumers, including other processes, can retrieve the data. It is anticipated that the domain consumers will have the knowledge necessary to translate the extracted content to domain specific attributes. For example, the XML element <item type="review"> . . . </item> shown in FIG. 9 may be used to populate an entry in the review table of a restaurants database.

Returning again to FIG. 3, it can be seen that the last step of URI analysis process is a hash generation and comparison process. In addition to the other differences between the invention and a traditional keyword based statistical crawlers, the invention differs significantly in the way that content change on a web page is detected. Traditional search engines depend on changes in content length, that is, changes to the total number of characters, and/or changes to what they deem the most representative portion of a web page, to indicate that a web page has been modified since the last time it was crawled. However, this is not always an efficient or effective strategy since simple changes to page style, embedded Java-Script, and/or page layout can affect content length without there being any change to the actual content of interest. The analysis mechanism of the invention is advantageous in that it is more immune to 'false change indicators' as it uses a hash computed on the actual collected and extracted content for comparison with a previous crawl's results. In this way, only content of interest is actually tracked, permitting the invention to more effectively calculate how often a specific URI should be revisited. Additionally, the same hash is employed to detect duplicate copies of the same content that may potentially be replicated across multiple sites.

As noted earlier, and illustrated in FIG. 1, the invention can employ both a web crawling mechanism and blog crawling mechanism. While web crawling is an effective approach to crawling websites which carry large amount of content for various local businesses, the blog crawler/extractor is designed to handle content from blogs which tend to be more ad hoc in their structure and, therefore, harder to discover through traditional crawling mechanisms.

Figure 11:
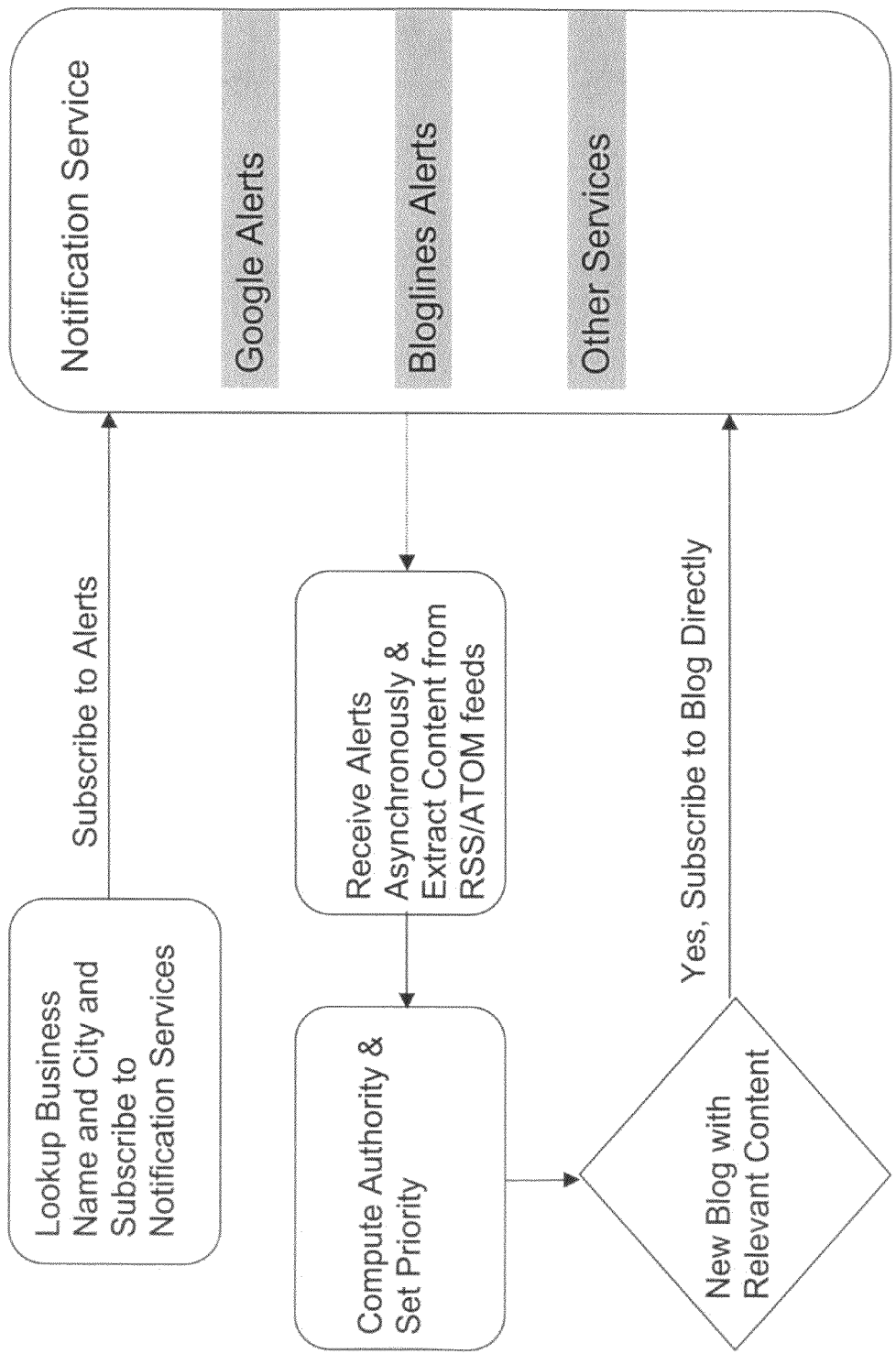
FIG. 11 is a flow chart illustrating a blog crawling subsystem constructed in accordance with the instant invention.

Turning to FIG. 11, a flow chart of a blog crawling mechanism in accordance with the instant invention is shown. The blog crawler starts out by selecting a business name and corresponding city in which the business is located for each business in a list of local businesses provided by either Axciom, Amacai or another source. In a preferred embodiment, a simple query string, which is a straight concatenation of business name and business city, is created for each business. By way of example, a restaurant such as "The Counter" in "Palo Alto, Calif." would form a query string such as "The Counter Palo Alto". This string is then submitted to one of many free notification services that are available on the Internet such as Google Alert Service or the Bloglines Alert Service. Each of these services monitor new blog posts on the Internet through their relationships with all the blogging platforms and then provides notification, on demand, based on keyword queries submitted by their consumers. In accordance with one embodiment of the invention, the blog crawler/extractor acts as a subscriber to the Google Alert service and is notified of any blog post that contains the all the keywords in a simple query string. In practice this notification includes a link to the particular blog as well as the first few words of that blog post. Unlike web crawler of the invention, the blog crawler also involves extraction of content prior to entity mapping since extraction is a pre-requisite for entity mapping in the case of unstructured blog input. The blog crawler captures the entire html page provided by the notification service and extracts the entire content from the post. The content extracted in this process is usually in either RSS or ATOM format, which are the current standards for exposing content from blogs on the Internet. The extracted content from the blogs in RSS or ATOM formats contains following attributes:

Post Entry Title
Author
Blog Content
Blog Description
Blog Categories

Similar to content extraction associated with web crawler, as illustrated in FIG. 9, the blog crawler employs a simpler template based mechanism as illustrated in FIG. 12. In general, blog extraction templates simpler than large-scale structured format websites, since all blogs, collectively, are based on a small number of platforms, such as wordpress and blogger, and each blog on a particular platform tend to comprise similar formatic elements.

Once the content is extracted from the blog entry it is sent to entity mapper to uniquely identify the business that is referred to within the content. If a match is found, the blog content and the corresponding blog post are associated with that business. In some cases, the number of blogs that match the keywords in a query string is large and can pose a burden on the system of the invention. Therefore, as and when a particular blog is mapped to an entity, it's importance increases, since that blog has been identified as a source of relevant information. As a result, when new blog posts from the same blog are received from the Notification Service, they are prioritized ahead of other blogs that may not have any blog posts mapped to a local business in the database.

The operation of blog analyzer is similar to that of web extractor/analyzer, but requires less processing power and has a simpler task since it primarily is used to verify if retrieved and extracted blog content is duplicative of previously retrieved blog content by comparing the original blog post date, the author and title.

Accordingly, a method and system for identifying, collecting, analyzing, mapping and extracting relevant information, including reviews and opinions, as well as corresponding attributes such as the specific reviewer identification, review date, review rating, menus, discounts, photos, videos and podcasts associated with a specific local from multiple online data sources, including professional review websites, community forums and blogs is provided. The invention teaches a method and system for crawling multiple websites containing one or more web pages having information relevant to a particular domain of interest, such as details about local restaurants, extracting content from such websites, such as hours, location, phone number as well as reviews, review dates and user tags, and associating the extracted content with a specific business entity. The invention provides a scalable means to generate structured information extracted from both structured sites, such as citysearch.com, as well as unstructured web pages containing information about local businesses, such as user generated content found on blogs.

The above disclosure is presented as being sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Further, it will be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

Finally, it is also to be understood that the following claims are intended to cover all of the generic and specific features of the invention herein described and all statements of the scope of the invention, which, as a matter of language, might be said to fall there between.

What is claimed is:

1. A system for collecting information from a web page, comprising:
   a file system; and
   a processor operatively connected to the file system and having functionality to execute instructions for:
      obtaining and storing contents of the web page;

evaluating the contents to identify a unique identifier within the contents;

transforming the contents to a normalized form by analyzing the contents to identify at least one selected from a group consisting of a street name, a street number, a street direction, a house number, a neighborhood, a city name, a state name, a zip code and a point of interest;

parsing the normalized form of the contents to identify at least one token, wherein the at least one token comprises a portion of a physical address and an associated telephone number;

semantically analyzing, using a plurality of heuristic rules, the at least one token to identify a plurality of possible business identifications;

assigning, based on at least the portion of the physical address and the associated telephone number, a plurality of confidence scores to the plurality of possible business identifications;

identifying a highest confidence score of the plurality of confidence scores;

identifying, in the plurality of possible business identifications, a business identification corresponding to the highest confidence score;

mapping the unique identifier to the business identification;

extracting, after mapping the unique identifier to the business identification, at least one element from the contents of the web page using an extraction template, the extraction template generated based on a structure of the web page, the at least one element comprising data related to a business identified by the business identification;

associating the at least one element related to the business with the business identification; and publishing results of the association of the at least one element with the business identification.

2. The system of claim 1, wherein evaluating the contents to identify the unique identifier within the contents further comprises:

analyzing an underlying construction of the web page to identify at least one link to other web pages; and storing the at least one link to other web pages.

3. The system of claim 1, wherein the web page is from a structured web site comprising web pages formatted in a pre-defined manner.

4. The system of claim 1, wherein the web page is from an unstructured web site.

5. The system of claim 1, wherein the instructions are further for identifying when the contents of the web page are modified, and wherein the web page is crawled again to store new contents.

6. A method for collecting information, comprising:

identifying, using a processor, a plurality of web pages that are likely to comprise information about a business;

crawling, using the processor, the plurality of web pages to collect and store contents of the plurality of web pages;

evaluating, using the processor, the contents by:

transforming the contents to a normalized form by analyzing the contents to identify at least one selected from a group consisting of a street name, a street number, a street direction, a house number, a neighborhood, a city name, a state name, a zip code and a point of interest;

parsing the normalized form of the contents to identify at least one token, wherein the at least one token comprises a portion of a physical address and an associated telephone number;

semantically analyzing, using a plurality of heuristic rules, the at least one token to identify a plurality of possible business identifications;

assigning, based on at least the portion of the physical address and the associated telephone number, a plurality of confidence scores to the plurality of possible business identifications;

identifying a highest confidence score of the plurality of confidence scores;

identifying, in the plurality of possible business identifications, a business identification corresponding to the highest confidence score; and mapping the business identification to the business;

extracting, using the processor and after mapping the business identification to the business, the information about the business from the contents; and publishing, using the processor, the information about the business.

7. A system for crawling websites, comprising:

a file system; and a processor operatively connected to the file system and having functionality to execute instructions for:

identifying a plurality of websites comprising information about a plurality of businesses;

crawling a seed uniform resource locator (URL) located within a website of the plurality of websites;

obtaining and storing contents of the website at a first web page identified by the seed URL;

analyzing the contents to identify links from the website to other URLs and to identify at least one other URL of the other URLs that links to a second web page comprising an attribute of interest about a business of the plurality of businesses;

storing the at least one other URL for use as an additional seed URLs;

extracting a business identification code from the contents, wherein the business identification code is a unique identifier used to organize information about the business on the website; and analyzing the contents to associate the contents with the business by:

transforming the contents to a normalized form by analyzing the contents to identify at least one selected from a group consisting of a street name, a street number, a street direction, a house number, a neighborhood, a city name, a state name, a zip code and a point of interest;

parsing the normalized form of the contents to identify at least a portion of a physical address and an associated telephone number;

semantically analyzing, using a plurality of heuristic rules, the portion of the physical address and the associated telephone number to identify a plurality of possible business identifications;

assigning, based on at least the portion of the physical address and the associated telephone number, a plurality of confidence scores to the plurality of possible business identifications;

identifying a highest confidence score of the plurality of confidence scores;

identifying, in the plurality of possible business identifications, a business identification corresponding to the highest confidence score;

mapping the business identification code to the business identification;

extracting, after mapping the business identification code to the business identification, other information about the business from the contents and associating the other information with the business; and publishing the other information about the business.

8. The system of claim 7, wherein the business is a restaurant and wherein the second web page comprises at least one selected from a group consisting of reviews, ratings, directions, and bibliographic information.

9. The system of claim 8, wherein extracting the other information about the business from the contents is performed using a heuristically derived extraction template.

10. The system of claim 7, wherein the seed URL identifies a blog.

11. The system of claim 10, wherein identifying the plurality of websites comprising the information about the plurality of businesses further comprises:

creating a plurality of query strings, each of the plurality of query strings comprising a name and a city of operation of the business;

submitting each of the plurality of query strings to a notification service that monitors publication of new or altered information in blogs; and receiving an indication from the notification service when an updated web page is identified as matching a query string of the plurality of query strings, the indication including the URL of the updated web page, wherein the updated web page is identified as comprising the information about the business.

12. The method of claim 6, wherein evaluating the contents further comprises:

analyzing an underlying construction of each of the plurality of web pages to identify at least one link to other web pages; and storing the at least one link to other web pages.

13. The method of claim 6, wherein at least one of the plurality of web pages is from a structured web site comprising structured web pages formatted in a pre-defined manner.

14. The method of claim 6, wherein at least one of the plurality of web pages is from an unstructured web site.

15. The method of claim 6, further comprising:

identifying when the contents of the plurality of web pages is modified, wherein the plurality of web pages is crawled again to store new contents.

* * * * *